United States Patent [19]

Shima

[11] Patent Number: 4,865,537
[45] Date of Patent: Sep. 12, 1989

[54] MOLD CLAMPING DEVICE

[75] Inventor: Yoshiharu Shima, Sakaki, Nagano-Ken, Japan

[73] Assignee: Nissei Jushi Kogyo Kabushiki Kaisha, Nagano, Japan

[21] Appl. No.: 250,847

[22] Filed: Sep. 29, 1988

[30] Foreign Application Priority Data

Sep. 30, 1987 [JP] Japan .................. 62-247027

[51] Int. Cl.$^4$ ............................................. B29C 45/67
[52] U.S. Cl. ..................................... 425/590; 425/451; 425/591; 425/DIG. 223
[58] Field of Search ............. 425/590, 591, 589, 451.2, 425/192 R, 54.1, DIG. 221, DIG. 223

[56] References Cited

U.S. PATENT DOCUMENTS

| | | | |
|---|---|---|---|
| 4,158,327 | 6/1979 | Aoki | 91/519 |
| 4,380,427 | 4/1983 | Hehl | 425/590 |
| 4,545,756 | 10/1985 | Hiroshi et al. | 425/590 |
| 4,565,116 | 1/1986 | Hehl | 91/519 |
| 4,605,367 | 8/1986 | Gatjahr | 425/150 |
| 4,744,740 | 5/1988 | Kojima | 425/107 |

FOREIGN PATENT DOCUMENTS 57-115329 7/1982 Japan .
61-268423 11/1986 Japan .
62-187008 8/1987 Japan .................. 425/451.2

Primary Examiner—Jay H. Woo
Assistant Examiner—Khanh P. Nguyen
Attorney, Agent, or Firm—Birch, Stewart, Kolasch & Birch

[57] ABSTRACT

In the present invention, an inner space of a clamping cylinder is divided into a front oil chamber and a rear oil chamber for liquid pressure by a piston section of a clamping ram, the front oil chamber and the rear oil chamber are connected with each other by a connecting path which is bored in the piston section of the clamping ram, and the front oil chamber is connected to a charge tank via a second open-close valve. In the clamping ram, an oil chamber for mold closure and an oil chamber for mold opening are formed by slidably fitting a high speed piston therein. A first open-close valve, which opens or closes the connecting path of the piston section of the clamping ram, is slidably fitted on the rear end section of the clamping ram. An oil chamber for valve opening, which is formed between the first open-close valve and the outer face of the clamping ram, is connected to the oil chamber for mold opening via a through-hole bored in the clamping ram.

11 Claims, 3 Drawing Sheets

MOLD CLAMPING DEVICE

FIELD OF THE INVENTION

This invention relates to a mold clamping device, and effectively, to a mold clamping device for injection molding machines and die casting machines.

BACKGROUND OF THE INVENTION

In the direct pressure type mold clamping devices for injection molding machines and die casting machines, it is necessary to open or close molds at a high speed for reducing the time of the molding cycle. In addition, it is also necessary to clamp molds with a large force to oppose the molding pressure.

To satisfy these opposite operations, this particular type of mold clamping device generally has a complex structure. Further, many kinds of mold clamping devices exist.

For example, a conventional mold clamping device for a plastic injection molding machine, which has been disclosed as Japanese Patent Provisional Publication gazette 57-115329, has the following structure.

Namely, a plurality of generally parallel liquid pressure driven cylinders for opening the mold and a high power clamping cylinder are provided. A single acting piston for mold clamping is fitted backward to a clamping ram of the clamping cylinder. The liquid pressure chambers of the liquid pressure driven cylinders are connected to the front oil chamber of the clamping cylinder. The front oil chamber and the rear oil chamber of the clamping cylinder are connected with each other by the connecting path of the piston section of the clamping ram. The connecting path is opened or closed by a first open-close valve which is operated by oil pressure from outside.

In this mold clamping device, at mold opening or mold closure, oil in the front oil chamber of the clamping cylinder and oil in the liquid pressure driven cylinders travel via the connecting path of the piston section of the clamping ram, so that negative pressure scarcely generates in the cylinders and smooth operation can be executed. Further, the clamping cylinder and the liquid pressure driven cylinders are arranged in parallel, there is an advantage of reducing total length of the device.

However, there are the following problems in the above stated mold clamping device.

(1) Because the mold opening operation is driven by the liquid pressure driven cylinders, a plurality of the liquid pressure driven cylinders must be provided on both sides of the clamping cylinder for balancing mold opening action.

(2) When the molds are opened, the oil chambers of the liquid pressure driven cylinders are pressurized so that the chambers are connected to the front and rear chambers of the clamping cylinder for oil flow. Therefore, the oil pressure affects not only the chambers of the liquid pressure driven cylinders but the front and rear chambers of the clamping cylinder so that the liquid pressure driven cylinders must have pressure proof structures. The front chamber of the clamping cylinder, which is not used for driving to open molds or to clamp them tightly, also must have a pressure proof structure. With such pressure proof structure, the device must be larger and heavier.

(3) The first open-close valve, which opens or closes the connecting path, provided in the piston section of the clamping ram is controlled in its operation by the oil path provided in the clamping ram and extended in the axial direction thereof and by the oil circuit connected to the path whose one end is opened to the surface of the clamping ram located in the vicinity of a movable board and is connected to a hydraulic machine via external piping. However, with this structure, it is difficult to machine or assemble the clamping ram, and there are problems in durability and safety because of the connecting of the external piping to movable portions.

(4) Many cylinder units, which need precision machining, are adopted so that manufacturing steps of producing the device are increased and the device will be expensive.

OBJECTS AND SUMMARY OF THE INVENTION

Therefore, this invention is provided to solve the above stated problems, and its objects are to provide a simple, compact and light mold clamping device which can execute smooth mold opening or mold closure without generating negative pressure in the clamping cylinder.

In the present invention, basically a front oil chamber and a rear oil chamber of a clamping cylinder, which are divided by a piston section of a clamping ram, are connected with each other by a connecting path bored through the piston section of the clamping ram. With this structure, when the piston section of the clamping ram travels in the clamping cylinder at mold closure and mold opening, the oil in the front oil chamber of the clamping cylinder travels via the connecting path so that no negative pressure generates in the clamping cylinder, and mold opening and mold closure can be executed smoothly. A amount lack or surplus of oil in both chambers is supplied from or returned to a charge tank.

After mold closure, when tight clamping is executed by supplying oil in the rear chamber of the clamping cylinder, the connecting path provided in the piston section of the clamping ram is closed by a first open-close valve. The operation of the first open-close valve is executed by closing a second open-close valve to pressurize the inner space of the clamping cylinder for generating effective pressure difference of both sides of the first open-close valve. The second open-close valve is necessary to move the first open-close valve in a prescribed direction to close the connecting path of the clamping ram.

During tight clamping, oil pressure in the front oil chamber of the clamping cylinder is released by a relief valve so that the front oil chamber is kept at low pressure. Therefore, it is scarcely necessary to form the front oil chamber of the clamping cylinder and the charge tank as a pressure proof structure because they are kept at low pressure so that their structures can be simple. Note that, after beginning the tight clamping operation by closing the connecting path of the piston section of the clamping ram, the second open-close valve may open to release the oil pressure in the front oil chamber of the clamping cylinder to the charge tank, therefore the relief valve can be eliminated in this case.

During mold opening, the first open-close valve is moved to open the connecting path of the piston section of the clamping ram. This movement is executed with mold opening operation by supplying oil from an oil chamber for mold opening which is formed in the clamping ram to an oil chamber for an opening valve which is formed as a gap between the first open-close valve and the periphery of the clamping ram via a through-hole bored in the clamping ram. Therefore, an oil circuit for operating the first open-close valve can be quite simple.

Mold opening or mold closing operation by sliding the clamping ram in the clamping cylinder can be executed by using a front oil chamber for mold closure and a rear oil chamber for mold opening which are divided by a piston section of a high-speed piston slidably fitted into the clamping ram. Preferably, the front chamber of the clamping ram is formed as an air chamber connecting to the atmosphere, and the oil chamber for mold closure is formed in the high-speed piston by fitting a piston rod whose one end is fixed on the wall of the air chamber in the high-speed piston from the front end thereof. In this case, as a result of selecting the cross sectional area of the piston rod, the effective cross sectional area of the oil chamber for mold closure and the effective cross sectional area of the oil chamber for mold closure can be substantially equal, so that the speed of mold closure and the speed of mold opening can be the same without an external switching valve, and efficiency of molding cycle can be increased.

Therefore, the present invention has the following advantages.

(1) During mold opening and mold closure, upon moving the piston section of the clamping ram in the clamping cylinder, the oil in the clamping cylinder travels via the connecting path of the piston section of the clamping ram so that the operation of mold opening and mold closure can be smoothly executed without generating negative pressure in the clamping cylinder.

(2) The operation of mold opening or mold closure can be executed by pressurizing only the oil chamber for mold closure or the oil chamber for mold opening in the clamping ram. At tight clamping, clamping pressure scarcely affects the front oil chamber of the clamping cylinder, so that pressure in the front oil chamber of the clamping cylinder and the charge tank is seldom generated throughout the operation cycle. Therefore, it is not necessary for the front oil chamber of the clamping cylinder and the charge tank to have a pressure proof structure so that their structure can be simple and compact, and the device can be light and its manufacturing cost can be reduced.

(3) The movement of the first open-close valve can be executed by supplying oil from the oil chamber for mold opening to the oil chamber for valve opening via the through-hole bored in the clamping ram to connect the oil chamber for valve opening and the oil chamber for mold opening each other, so that external piping can be eliminated, whereby machining and assembling is easier, and durablity and safety is increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The preferred embodiments of the present invention will now be described by way of example with reference to the accompanying drawings which are given by weay of illustration only, and thus are not limitative of the present invention, and in which.

DETAILED DESCRIPTION OF PREFERRED EMBDIMENTS

Figure 1:
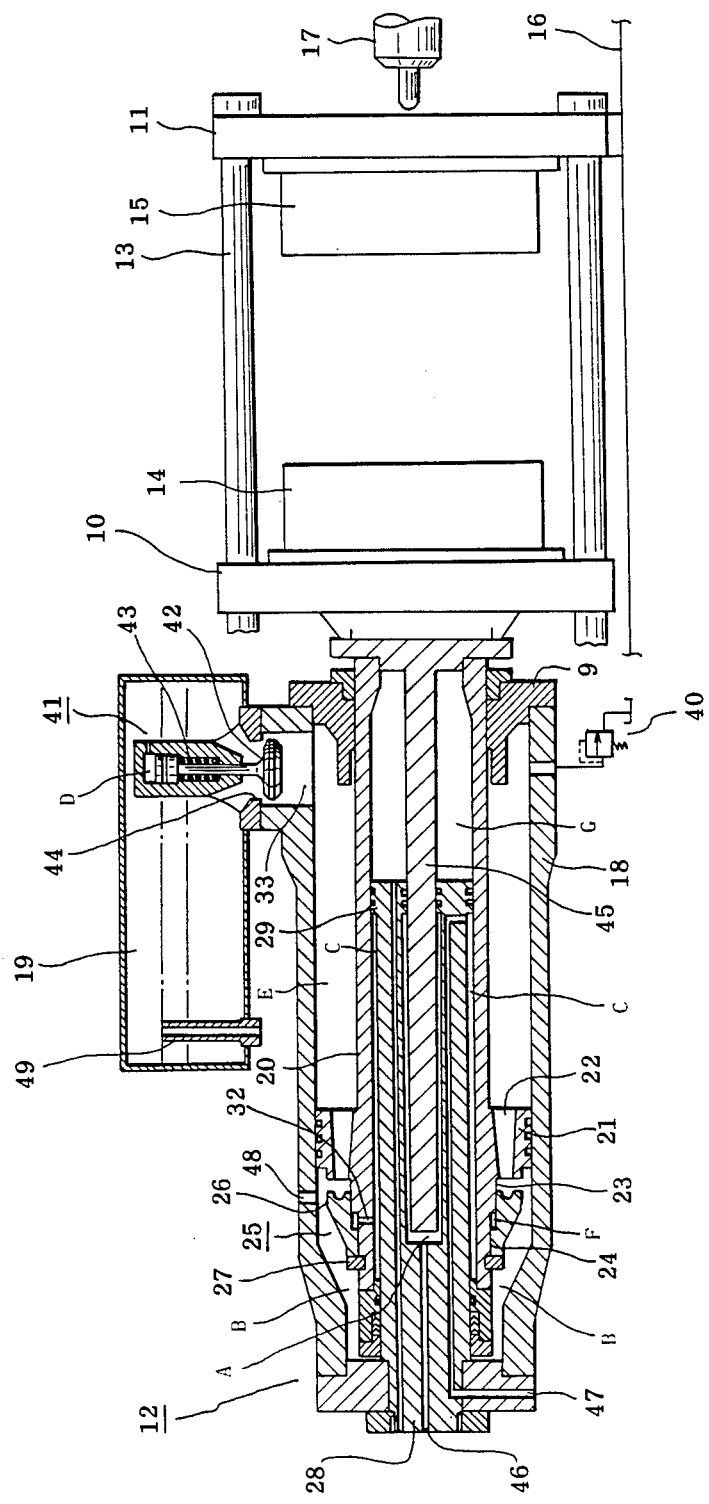
FIG. 1 shows a cross sectional view of a clamping cylinder in the mold opening status.

Preferred embodiments of the present invention will now be described in detail with reference to accompanying drawings as follows.

A movable board 10 is guided to move to and away from a fixed board 11 by a tie bar 13 which is spanned between the fixed board 11 and a cylinder block 12.

On each opposite face of the movable board 10 and the fixed board 11, there are provided a movable mold 14 and a fixed mold 15. On a base 16 provided at the rear side of the fixed board 11, there is provided an injection machine 17 which can be moved to and away from the fixed mold 15. On the cylinder block 12, a clamping cylinder 18 and charge tank 19 are arranged in parallel.

A clamping ram 20 whose front end is connected to the rear face of the movable board 10 is slidably fitted in the clamping cylinder 18 through the front lid 9. The inner space of the clamping cylinder 18 is divided into a front chamber E (to be described later) and a rear chamber B (to be described the chamber later) by the piston section 21 of the clamping ram 20. The chambers E and B are connected with each other by a connecting path 22 provided in the piston section 21.

The charge tank 19 is connected to the chamber E as a front oil chamber of the clamping cylinder 18. The capacity of the charge tank 19 is larger than the capacity difference between the chambers E and B of the clamping cylinder 18.

The chamber E is connected to a hydraulic machine via a relief valve 40 which is set at a low pressure.

A second open-close valve 41 opens and closes an oil path 33. Namely, a valve body 42 is normally biased to contact valve seat 44 for closing an oil path 33 by a coil spring 43. The valve body 42 is moved to open the oil path 33 acting against the elasticity of the coil spring 43 for connecting the charge tank 19 and the chamber E by supplying oil in the chamber D of the second open-close valve 41.

Figure 2:
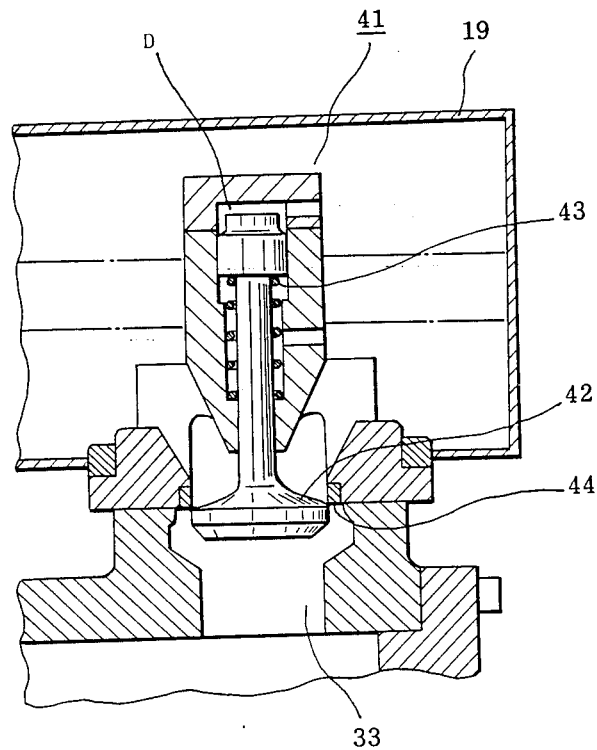
FIG. 2 shows an enlarged sectional view of a second open-close valve.

Enlarged view of the second open-close valve 41 is shown in FIG. 2. A portion of the clamping ram 20, which is extended into the chamber B, is formed of a large-diameter section 23 and a small-diameter section 24 whose diameter is smaller than the large-diameter section 23. A first open-close valve 25 is fitted onto the large-diameter section 23 and the small-diameter section 24, and is also slidable in the axial direction of the clamping ram 20 to open and close the connecting path 22. The first open-close valve 25 is formed of a piston ring, and its sleeve section 26 is guided on the periphery of the large-diameter section 23. The one end face of the sleeve section 26 is capable of closing the connecting path 22. There is fixed a stopper 27 to prevent the first open-close valve 25 from slipping out and to limit travelling length thereof on the small-diameter section 24. There is formed a space F (to be described later) between the inner face of the sleeve section 26 of the first open-close valve 25 and the outer face of the small-diameter section 24.

There is inserted a high-speed piston 28 whose rear end is fixed on the inner rear wall of the clamping cylinder 18 in the clamping ram 20. The inner space of the clamping ram 20 is divided into an air chamber G and a chamber C for mold opening (to be described later) by the piston section 29 of the high-speed piston 28. The air chamber G is connected to the atmosphere via a path (not shown). The chambers C and F are connected with each other via a through-hole bored in the clamping ram 20.

A front end of a piston rod 45, which is projected from the inner bottom face of the air chamber G of the clamping ram 20, is slidably fitted in the high-speed piston 28 so that a chamber A is formed for high speed mold closure (to be described later) in the high-speed piston 28. The chambers A and C are connected to a hydraulic machine (not shown) which is provided outside of the cylinder block 12 via an oil path 47. As seen in FIG. 1, a cross-sectional area of the piston rod 45 (the effective pressure receiving area of chamber A) is substantially equal to a cross-sectional area of the high-speed piston 28 minus the cross-sectional area of the rod section thereof (the effective pressure receiving area of chamber C).

Switching valves (not shown), which are provided outside of the cylinder block 12, are connected to the oil paths 46 and 47 to join the return oil from the chamber A to the oil path 47 for supplying it to the chamber C.

Note that, numeral 48 is an oil path to supply oil to the chamber B and numeral 49 is an overflow tube. Oil which overflows from the overflow tube is returned to a main tank (not shown).

Next, the action of the device will be described.
High-speed mold closure:

The chamber D is pressurized to move the valve body 42, the oil path 33 is opened, and the chamber and the charge tank 19 are connected.

Next, the oil is supplied to the chamber A via the oil path 46 to execute high speed mold closure. When the piston section 21 of the clamping ram 20 travels in the chamber E, the oil in the chamber E is introduced into the chamber B via the connecting path 22, lack of oil caused by amount difference between the chambers B and E is made up for from the charge tank 19, so that the chamber B will not have negative pressure and high speed mold closure can be executed.

Note that, the chambers E and B and the charge tank 19 are not pressurized so that the first open-close valve 25 has been moved to open the connecting path 22 by oil resistance caused by moving the piston section 21 of the clamping ram 20. Tight clamping:

Following the high speed mold closure caused by pressurizing the chamber A, the oil amount, which is supplied to the chamber, is reduced and the mold is closed at low speed and at low pressure.

Next, the chamber D is opened, the valve body 42 is pushed to the valve seat 44 by the elasticity of the coil spring 43 to close the oil path 33, and then the oil is supplied to the chamber B via the oil path 48 to be pressurized. Therefore, a pressure difference is generated between both sides of the first open-close valve 25 so that the first open-close valve 25 advances and the end face of the sleeve section 26 contacts the piston section 21 of the clamping ram 20 to close the connecting path 22. Then the oil supplied to the chamber B affects the rear end face of the clamping ram 20 to execute tight clamping. In this case, if the chamber A is pressurized simultaneously, output of the chamber A also affects tight clamping.

Note that, the pressure in the chamber E has been released by the relief valve 40 to keep chamber E at low pressure.

Keeping the tight clamping status, the injection machine 17 is advanced, and resin melt is injected into the molds, and after cooling and solidification, the next manufacturing step will be executed.

Note that, maintaining the chamber E at low pressure, the front lid 9 need not have high hardness. It can merely have a simple structure.

When the oil is supplied to the chamber B for tight clamping, the second open-close valve 41 is closed to generate effective pressure in the chambers B and E. With this generating effective pressure, pressure difference between both sides of the first open-close valve 25 is generated, and the first open-close vavle 25 is moved to close the connecting path 22. The chamber B is kept at low pressure by the action of the relief valve 40 until closing the connecting path 22. After closing the connecting path 22, the chamber B is pressurized for tight clamping. High pressure mold opening:

Upon stopping pressurizing in the chambers A and B, the pressure is released, the chamber D is pressurized to open the second open-close valve 41, and the chamber E and the charge tank 19 are connected by the oil path 33. Next, the oil is supplied to the oil path 47 to pressurize the chamber C for high pressure mold opening.

At that time, the chamber C is pressurized and then the chamber F is pressurized by the through-hole 32, so that the first open-close valve 25 is retracted to connect the chambers E and B via the connecting path 22, and the oil in the chamber B is returned to the chamber E and the charge tank 19.

Further, the oil returned from the chamber A is introduced to the oil path 47 via the oil path 46 and the switching valve (not shown), so that mold opening operation is accelerated to equalize the speed of mold opening to the speed of mold closure.

Note that, if the effective cross sectional area of the chambers A and C is designed to be equal, the speed of mold opening and the speed of mold closure can be equal without the switching valve.

Figure 3:
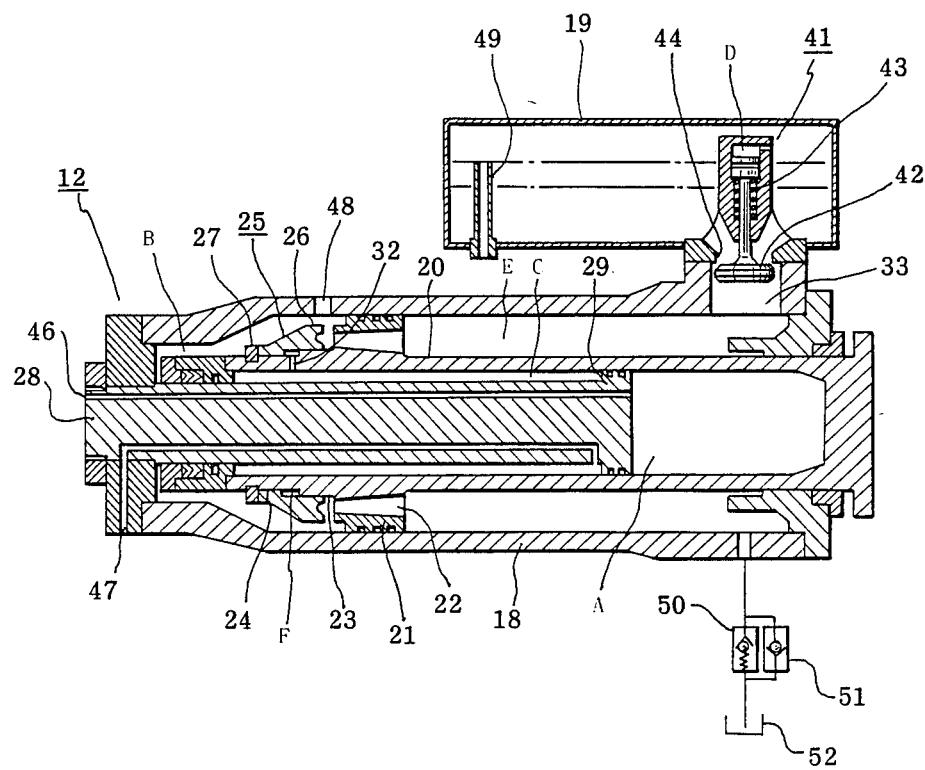
FIG. 3 shows a cross sectional view of a clamping cylinder of another embodiment.

Another embodiment is shown in FIG. 3.

In this embodiment, elements which are the same as the former embodiment are indicated by the same numerals, and an explanation thereof will be omitted.

A front oil chamber and a rear oil chamber of a clamping ram 20 are divided by a piston section 29 of a high speed piston 28, and the front oil chamber is formed as a chamber A for high speed mold closure. The rear oil chamber is formed as a chamber C for mold opening.

The chambers A and C are connected to a hydraulic machine (not shown) provided outside of a cylinder block 12 via oil paths 46 and 47. A switching valve (not shown), which is provided outside of the cylinder block 12, is connected to the oil paths 46 and 47 to introduce the return oil from the chamber C to the oil path 47 for supplying it to the chamber A.

In this embodiment, a chamber E is connected to an oil tank 52 by a spring check valve 50 and a check valve 51 which are arranged in parallel, and which allow the oil to pass in the opposite direction to each other.

Therefore, in the device in this embodiment, high speed mold closure is executed by supplying the oil from the oil path 46 to the chamber A. And high speed mold opening is executed by supplying the oil from the oil path 47 to the chamber C. During mold opening, the return oil from the chamber A is introduced to the oil path 47 via the oil path 46 and the switching valve (not shown), so that the speed of mold opening is accelerated to equalize the speed of mold opening to the speed of mold closure.

The spring check valve 50 releases the oil in the chamber E which is compressed during tight clamping to the oil tank 52 to keep the chamber E at low pressure, so it works as a safety valve. At transferring from tight clamping to mold opening with releasing the pressure in the chamber B, the check valve 51 prevents the chamber E from having a negative pressure by sucking oil which is escaped from the chamber E during tight clamping from the oil tank 52. Therefore, smooth mold opening can be executed.

Note that, the oil is introduced from the charge tank 19 to the chamber E during mold opening so the check valve 51 can be eliminated.

Figure 4:
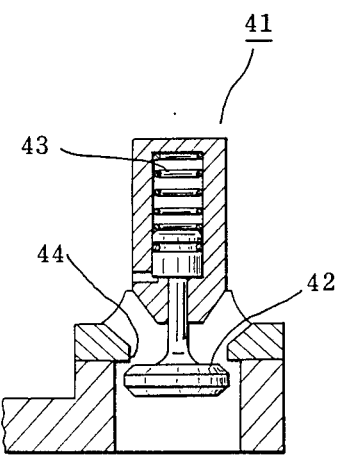
FIG. 4 shows a cross sectional view of a normally open type second open-close valve.

A second open-close valve 41 can be a normally open type valve as shown in FIG. 4. In this case, it can control its open or close status in a manner similar to the former embodiment. In case that the second open-close valve 41 is a normally open type, the oil is introduced quite smoothly from the charge tank 19 to the chamber E so that the check valve 51 can be eliminated.

The present invention being thus described, it will be obvious that the same may be varied in many ways. Such variation are not to be regarded as a departure from the sprit and scope of the invention, and all such modifications as would be obvious to one skilled in the art are intended to be included within the scope of the following claims.

What is claimed is:

1. A mold clamping device comprising:

a clamping cylinder slidably fitted with a clamping ram in a front end thereof, a front end of the clamping ram being connected to a movable board of a mold;

a rear high pressure chamber and a front oil chamber of said clamping cylinder being divided by a piston section of said clamping ram;

a first oil path for supplying oil to the rear high pressure chamber of said clamping cylinder;

a connecting path passing through a piston section of said clamping ram to connect the front oil chamber and the rear high pressure chamber of said clamping cylinder;

a first open-close valve being fitted on the rear end section of said clamping ram at the back of the piston section of said clamping ram, said first open-close valve opens said connecting path during mold opening and closing, and closes said connecting path during tight mold clamping;

a high speed piston for opening and closing said mold, said high speed piston being slidably fitted in said clamping ram from a rear end thereof, said high speed piston having a base section fixed on an inner rear wall of said clamping cylinder;

a front pressure chamber for high speed mold closure and a rear pressure chamber for high speed mold opening of said clamping ram divided by a piston section of said high speed piston;

a second oil path for supplying oil to the front pressure chamber in said clamping ram;

a third oil path for supplying oil to the rear pressure chamber in said clamping ram;

an oil chamber for valve opening being formed at a position where said first open-close valve is slidably fitted on said clamping ram;

a through-hole passing through said clamping ram to connect said rear pressure chamber for valve opening to said oil chamber for mold opening of said clamping ram;

a charge tank being provided alongside of said clamping cylinder, said charge tank being connected to the front oil chamber of said clamping cylinder and having a capacity larger than a capacity difference between the front oil chamber and the rear high pressure chamber of said clamping cylinder; and a second open-close valve for connecting and disconnecting the front oil chamber of said clamping cylinder and said charge tank.

2. The mold clamping device according to claim 1, wherein said first open-close valve is formed as a piston ring which is fitted on a large-diameter section and small-diameter section formed at the rear end section of said clamping ram, the end face of the piston ring being formed like a sleeve and being slidable on the large-diameter section of said clamping ram for one of opening and closing a path provided in the piston section of said clamping ram, and a space being defined between the inner face of the piston ring and the outer face of the small-diameter section of said clamping ram is formed as said oil chamber for valve opening.

3. The mold clamping device according to claim 1, wherein said second open-close valve opens to connect the front oil chamber of said clamping cylinder and said charge tank when the oil is supplied to the front pressure chamber for mold closure of said clamping ram and to the rear pressure chamber for mold opening thereof, and said second open-close valve closes the oil path between the front oil chamber of said clamping cylinder and said charge tank when the oil is supplied in the rear high pressure chamber of said clamping cylinder.

4. The mold clamping device according to claim 1, further comprising a relief valve for keeping the oil pressure in the front oil chamber of said clamping cylinder at a low pressure.

5. The mold clamping device according to claim 1, wherein the front oil chamber of said clamping cylinder is connected to an oil tank by a spring check valve for releasing oil to the oil tank to keep the front oil chamber at a low pressure and a check valve being provided generally parallel to the spring check valve for passing oil in an opposite direction.

6. A mold clamping device comprising:

a clamping cylinder slidably fitted with a clamping ram in a front end thereof, a front end of the clamping ram being connected to a movable board of a mold;

a rear high pressure chamber and a front oil chamber of said clamping cylinder being divided by a piston section of said clamping ram;

a first oil path for supplying oil to the rear high pressure chamber of said clamping cylinder;

a connecting path passing through the piston section of said clamping ram to connect the front oil chamber and the rear high pressure chamber of said clamping cylinder;

a first open-close valve being fitted on the rear end section of said clamping ram at the back of the piston section of said clamping ram, said first open-close valve opens said connecting path during mold opening and closing, and closes said connecting path during tight mold clamping;

a high-speed piston for opening and closing said mold, said high speed piston being slidably fitted in said clamping ram from a rear end thereof, said high speed piston having a base section fixed on an inner rear wall of said clamping cylinder;

a rear pressure chamber for mold opening and a front air chamber connected to atmosphere, said clamping ram being divided by a large-diameter piston section of said high-speed piston;

an oil chamber for mold closure being formed in said high speed piston by a piston rod which extends from the inner wall of the air chamber to slidably fit in said high speed piston from a front side thereof;

a second oil path for supplying oil to said oil chamber in said high speed piston for high speed mold closing;

a third oil path for supplying oil to the rear pressure chamber in said clamping ram for high speed mold opening;

an oil chamber for valve opening being formed at a position where said first open-close valve is slidably fitted on said clamping ram;

a through-hole passing through said clamping ram to connect said rear pressure chamber for valve opening to said oil chamber for mold opening of said clamping ram;

a charge tank being provided alongside of said clamping cylinder, said charge tank being connected to the front oil chamber of said clamping cylinder and having a capacity larger than a capacity difference between the front oil chamber and the rear high pressure chamber of said clamping cylinder; and a second open-close valve for connecting and disconnecting the front oil chamber of said clamping cylinder and said charge tank.

7. The mold clamping device according to claim 6, wherein said first open-close valve is formed as a piston ring which is fitted on a large-diameter section and small-diameter section formed at the rear end section of said clamping ram, the end face of the piston ring being formed like a sleeve and being slidable on the large-diameter section of said clamping ram for one of opening and closing a path provided in the piston section of said clamping ram, and a space being defined between the inner face of the piston ring and the outer face of the small-diameter section of said clamping ram is formed as said oil chamber for valve opening.

8. The mold clamping device according to claim 6, wherein said second open-close valve opens to connect the front oil chamber of said clamping cylinder and said charge tank when the oil is supplied to the front pressure chamber for mold closure of said clamping ram and to the rear pressure chamber for mold opening thereof, and said second open-close valve closes the oil path between the front oil chamber of said clamping cylinder and said charge tank when the oil is supplied to the rear high pressure chamber of said clamping cylinder.

9. The mold clamping device according to claim 6, further comprising a relief valve for keeping the oil pressure in the front oil chamber of said clamping cylinder at a low pressure.

10. The mold clamping device according to claim 6, wherein the front oil chamber of said clamping cylinder is connected to an oil tank by a spring check valve for releasing oil to the oil tank to keep the front oil chamber at a low pressure and a check valve being provided generally parallel to the spring check valve for passing oil in an opposite direction.

11. The mold clamping device according to claim 6, wherein an effective pressure receiving area of the rear pressure chamber for mold opening of said clamping ram is substantially equal to the effective pressure receiving area of the oil chamber for mold closure of said high speed piston.

* * * * *